(12) United States Patent
Baracaldo-Angel et al.

(10) Patent No.: US 11,334,709 B2
(45) Date of Patent: May 17, 2022

(54) CONTEXTUALLY ADJUSTING DEVICE NOTIFICATIONS

(71) Applicant: International Business Machines Corporation, Armonk, NY (US)

(72) Inventors: Nathalie Baracaldo-Angel, San Jose, CA (US); Margaret H. Szymanski, Santa Clara, CA (US); Eric K. Butler, San Jose, CA (US); Heiko H. Ludwig, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 16/189,991

(22) Filed: Nov. 13, 2018

(65) Prior Publication Data

US 2020/0151240 A1 May 14, 2020

(51) Int. Cl.
| | |
|---|---|
| *H04L 67/52* | (2022.01) |
| *G06F 9/54* | (2006.01) |
| *G06F 21/62* | (2013.01) |
| *G06F 40/117* | (2020.01) |
| *G06F 40/205* | (2020.01) |
| *G06N 20/00* | (2019.01) |
| *G06N 3/08* | (2006.01) |

(52) U.S. Cl.
CPC ............ *G06F 40/117* (2020.01); *G06F 9/542* (2013.01); *G06F 21/6245* (2013.01); *G06F 40/205* (2020.01); *G06N 20/00* (2019.01); *H04L 67/18* (2013.01)

(58) Field of Classification Search
CPC ...... H04L 67/18; G06F 40/117; G06F 40/205; G06F 21/6245; G06F 9/542; G06N 20/00
See application file for complete search history.

(56) References Cited

U.S. PATENT DOCUMENTS

| | | | |
|---|---|---|---|
| 8,805,337 B2 * | 8/2014 | Deshpande | H04W 80/12 370/467 |
| 9,225,688 B2 | 12/2015 | Biswas et al. | |
| 9,298,897 B2 | 3/2016 | Broadstone et al. | |
| 9,578,512 B1 | 2/2017 | Avegliano et al. | |
| 9,936,333 B2 * | 4/2018 | Lau | G06F 8/61 |
| 10,310,471 B2 * | 6/2019 | Krasadakis | G05B 19/048 |
| 2017/0039389 A1 * | 2/2017 | Smith | G06F 21/60 |
| 2017/0291543 A1 * | 10/2017 | Goldman-Shenhar | G08G 1/166 |
| 2018/0220427 A1 * | 8/2018 | Hwang | H04L 67/34 |

OTHER PUBLICATIONS

Mohan et al., "GUPT: Privacy Preserving Data Analysis Made Easy," SIGMOD, May 2012, 12 pages.
(Continued)

*Primary Examiner* — Fatoumata Traore
*Assistant Examiner* — Hamid Talaminaei
(74) *Attorney, Agent, or Firm* — Zilka-Kotab, P.C.

(57) ABSTRACT

A computer-implemented method according to one embodiment includes identifying a topic associated with a received notification, determining a plurality of policies associated with the topic, determining a current environmental context, determining a generalization level, utilizing the plurality of policies and the current environmental context, modifying the notification, based on the generalization level, and presenting the modified notification.

17 Claims, 5 Drawing Sheets

(56) References Cited

OTHER PUBLICATIONS

Shokri et al., "Privacy-Preserving Deep Learning," CCS, Oct. 2015, 12 pages.
Anonymous, "Filtering notifications from multiple devices," IP.com Prior Art Database, Technical Disclosure No. IPCOM000247660D, Sep. 26, 2016, 4 pages.
Anonymous, "Prevention of multiple notifications across multiple devices," IP.com Prior Art Database, Technical Disclosure No. IPCOM000241329D, Apr. 17, 2015, 4 pages.
Roesner et al., "World-Driven Access Control for Continuous Sensing," CCS14, 2014, 12 pages, retrieved from https://www.microsoft.com/en-us/research/publication/world-driven-access-control-for-continuous-sensing/.
Langheinrich, M., "A Privacy Awareness System for Ubiquitous Computing Environments," Institute of Information Systems, ETH Zurich, 2002, 8 pages, retrieved from https://pdfs.semanticscholar.org/9f4b/d1889760045a07f3bc57f26c8b01e4782d45.pdf.
Castro et al., "Predicting Daily Activities From Egocentric Images Using Deep Learning," ISWC, Sep. 2015, pp. 75-82.
Templeman et al., "PlaceAvoider: Steering First-Person Cameras away from Sensitive Spaces," NDSS, Feb. 2014, 15 pages.
Korayem et al., "Enhancing Lifelogging Privacy by Detecting Screens," CHI, May 2016, pp. 1-6.
Butler et al., "The Privacy-Utility Tradeoff for Remotely Teleoperated Robots," HRI15, Mar. 2015, 8 pages.

\* cited by examiner

US 11,334,709 B2

CONTEXTUALLY ADJUSTING DEVICE NOTIFICATIONS

BACKGROUND

The present invention relates to data analysis, and more specifically, this invention relates to contextual device notification analysis and adjustment.

Many devices currently provide notifications services to users. For example, devices such as mobile devices, smart speakers, and companion robots may provide calendar notifications, email and message alerts, and other notifications directly to users. However, there is currently no way to dynamically protect data security when providing such notification to users.

SUMMARY

According to one embodiment, a computer-implemented method includes receiving a notification, identifying a topic associated with the notification, determining a plurality of policies associated with the topic, determining a current environmental context, determining a generalization level, utilizing the plurality of policies and the current environmental context, modifying the notification, based on the generalization level, and presenting the modified notification.

According to another embodiment, a computer program product for contextually adjusting device notifications includes a computer readable storage medium that has program instructions embodied therewith, where the computer readable storage medium is not a transitory signal per se, and where the program instructions are executable by a processor to cause the processor to perform a method including receiving a notification, utilizing the processor, identifying a topic associated with the notification, utilizing the processor, determining a plurality of policies associated with the topic, utilizing the processor, determining a current environmental context, utilizing the processor, determining, utilizing the processor, a generalization level, utilizing the plurality of policies and the current environmental context, modifying, utilizing the processor, the notification, based on the generalization level, and presenting the modified notification, utilizing the processor.

According to another embodiment, a system includes a processor, and logic integrated with the processor, executable by the processor, or integrated with and executable by the processor, where the logic is configured to receive a notification, identify a topic associated with the notification, determine a plurality of policies associated with the topic, determine a current environmental context, determine a generalization level, utilizing the plurality of policies and the current environmental context, modify the notification, based on the generalization level, and present the modified notification.

Other aspects and embodiments of the present invention will become apparent from the following detailed description, which, when taken in conjunction with the drawings, illustrate by way of example the principles of the invention.

DETAILED DESCRIPTION

Figure 1:
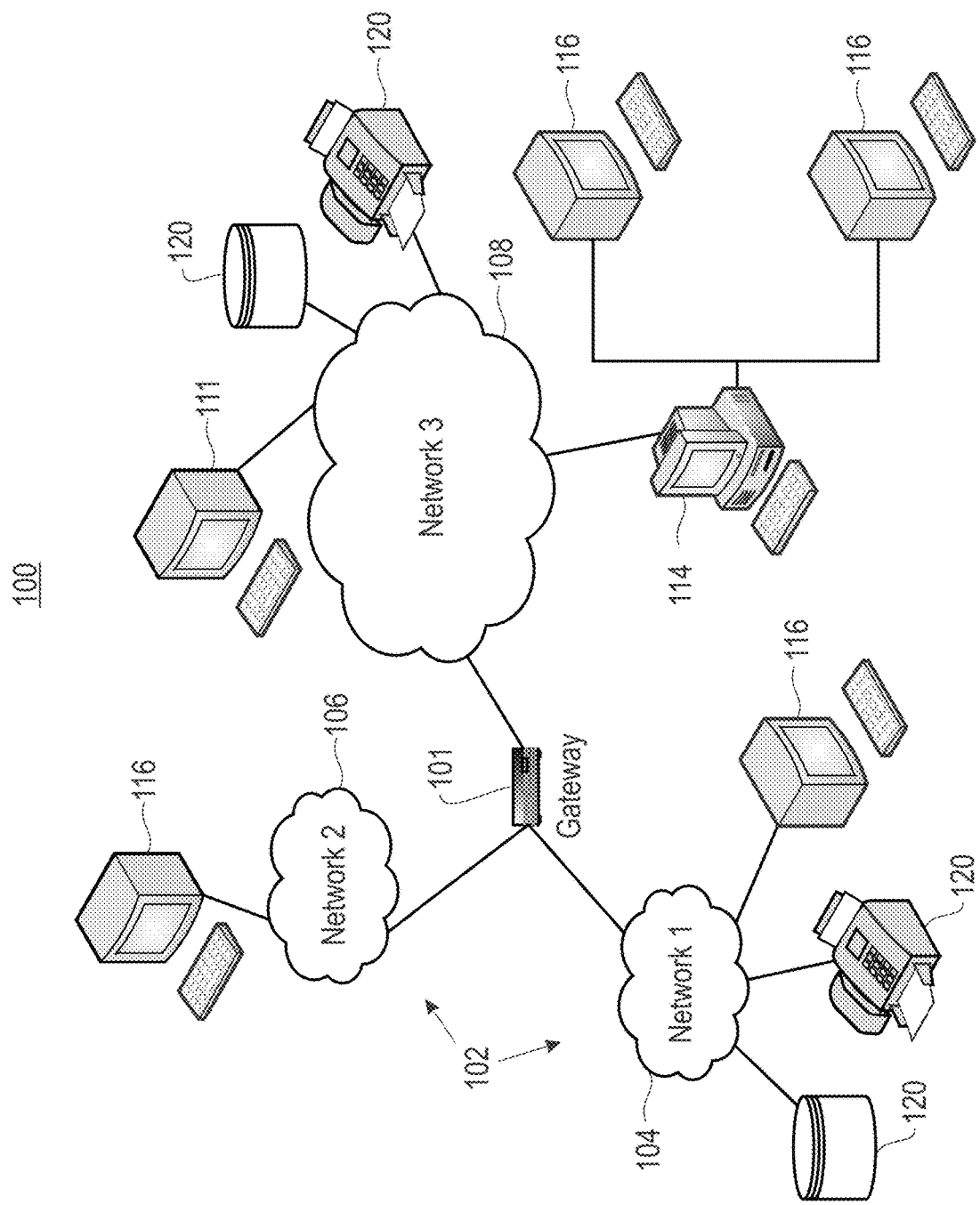
FIG. 1 illustrates a network architecture, in accordance with one embodiment.

The following description discloses several preferred embodiments of systems, methods and computer program products for contextually adjusting device notifications. Various embodiments provide a method to modify notifications received by a device, based on predetermined policies and an environmental context.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for contextually adjusting device notifications.

In one general embodiment, a computer-implemented method includes receiving a notification, identifying a topic associated with the notification, determining a plurality of policies associated with the topic, determining a current environmental context, determining a generalization level, utilizing the plurality of policies and the current environmental context, modifying the notification, based on the generalization level, and presenting the modified notification.

In another general embodiment, a computer program product for contextually adjusting device notifications includes a computer readable storage medium that has program instructions embodied therewith, where the computer readable storage medium is not a transitory signal per se, and where the program instructions are executable by a processor to cause the processor to perform a method including receiving a notification, utilizing the processor, identifying a topic associated with the notification, utilizing the processor, determining a plurality of policies associated with the topic, utilizing the processor, determining a current environmental context, utilizing the processor, determining, utilizing the processor, a generalization level, utilizing the plurality of policies and the current environmental context, modifying, utilizing the processor, the notification, based on the generalization level, and presenting the modified notification, utilizing the processor.

In another general embodiment, a system includes a processor, and logic integrated with the processor, executable by the processor, or integrated with and executable by the processor, where the logic is configured to receive a notification, identify a topic associated with the notification, determine a plurality of policies associated with the topic, determine a current environmental context, determine a generalization level, utilizing the plurality of policies and the current environmental context, modify the notification, based on the generalization level, and present the modified notification.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
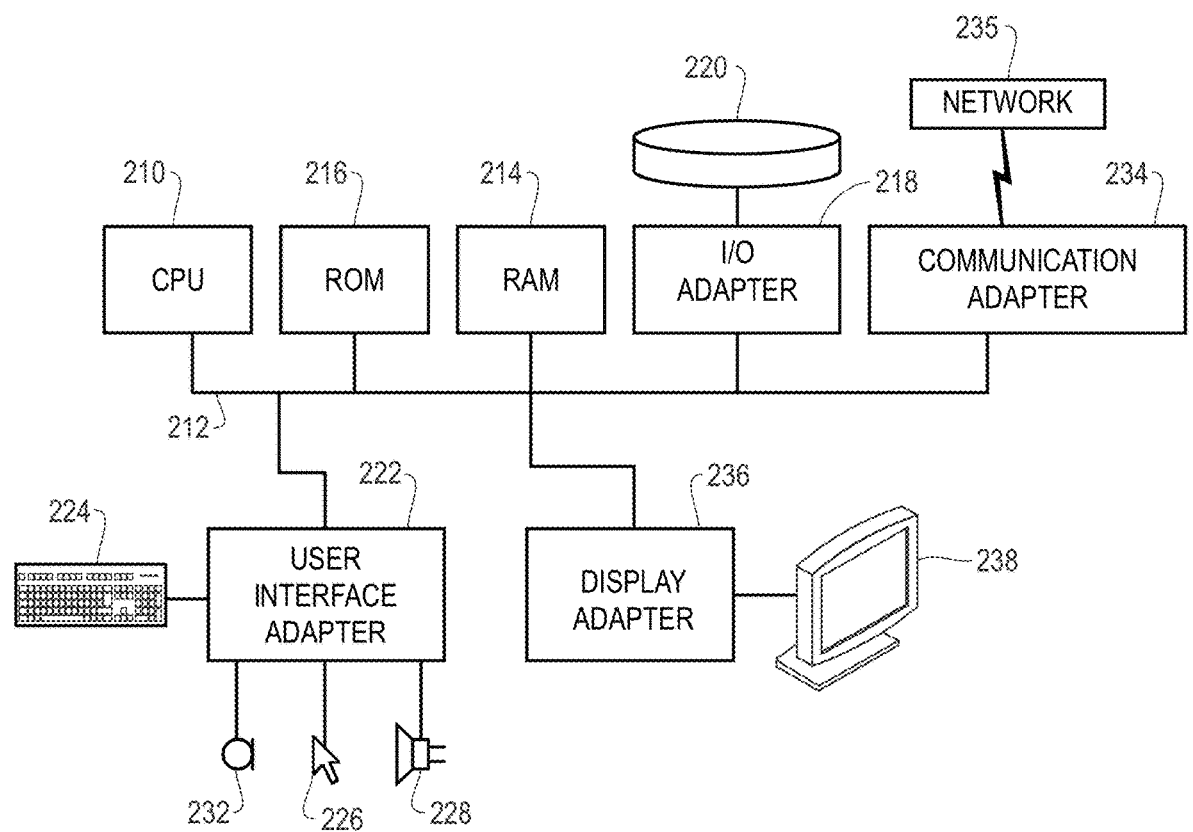
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
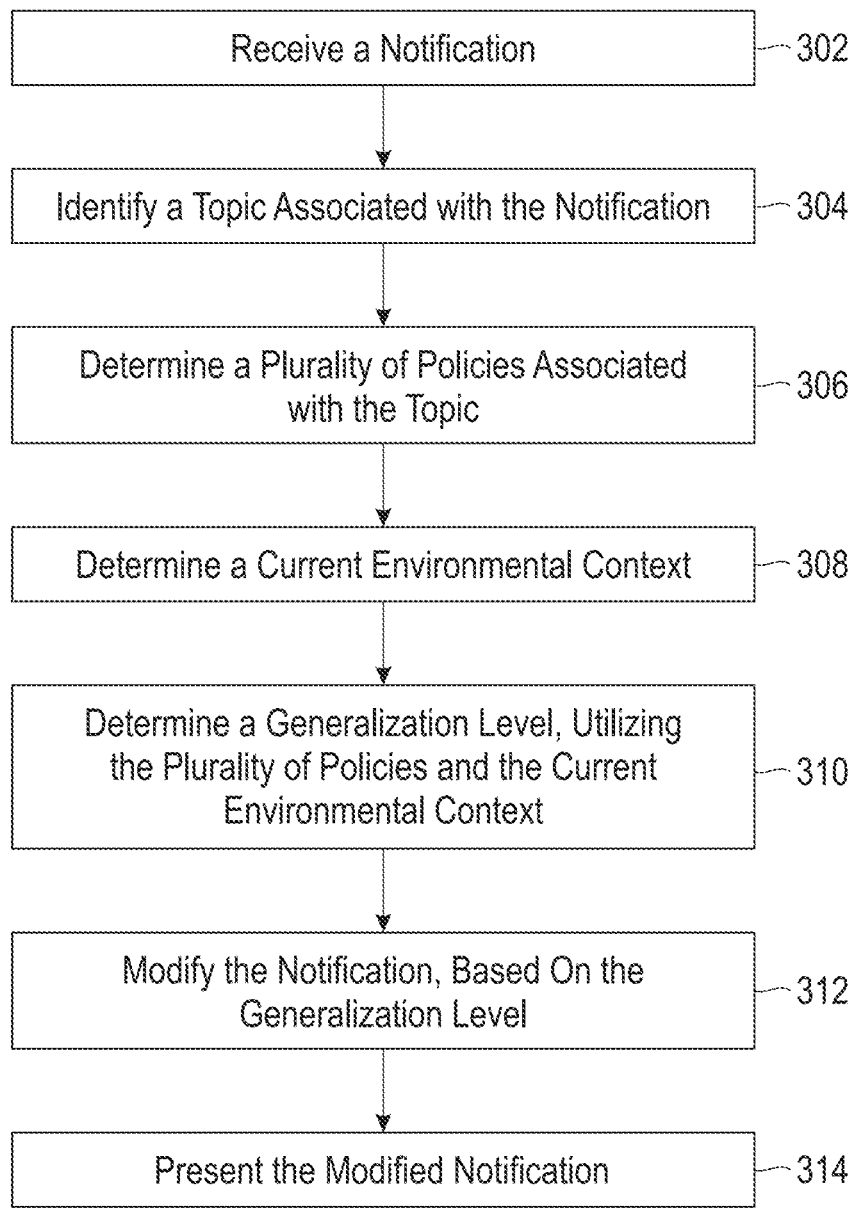
FIG. 3 illustrates a method for contextually adjusting device notifications, in accordance with one embodiment.

Now referring to FIG. 3, a flowchart of a method 300 is shown according to one embodiment. The method 300 may be performed in accordance with the present invention in any of the environments depicted in FIGS. 1, 2, 4, and 5, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where a notification is received. In one embodiment, the notification may be received at a device. For example, the device may include any device capable of receiving a notification, including mobile computing device, a desktop computing device, a cellular telephone, a robot assistant, an intercom notification device, etc. In another example, the device may be associated with one or more users. For instance, the device may be registered to one or more users.

Additionally, in one embodiment, the notification may be received via one or more interfaces. For example, the notification may be received via a data transmission interface of a device. In another example, the notification may be received via a notification application programming interface (API) of the device. In another embodiment, the notification may be received from an application running within the device (e.g., a calendar application, etc.). In yet another embodiment, the notification may be received from an application/service running remotely from the device (e.g., a messaging server, a cloud-based calendar or message server, etc.).

Further, in one embodiment, the notification may include one or more of text, audio, images, and video. For example, the notification may include one or more of a text message, a multimedia message, a video, an electronic mail (email) message, a voicemail message, a time and/or calendar-based alert, etc. In another embodiment, the notification may include a hologram. In yet another embodiment, the notification may be associated with one or more users. For example, the notification may be sent to the one or more users. In yet another embodiment, the notification may include material to be presented to the user utilizing the device.

Further still, method 300 may proceed with operation 304, where a topic associated with the notification is identified. In one embodiment, the topic may include one or more terms categorizing the notification. In another embodiment, the topic may be identified utilizing textual classification. For example, one or more terms may be identified within the notification as a result of a textual analysis. In another example, the one or more terms may be compared to a list of predetermined terms that are linked to associated topics in order to determine one or more topics associated with the notification. In yet another example, the identified terms may be input into a neural network trained to determine an associated topic when given one or more input terms.

Also, in one embodiment, if the notification includes audio, the audio within the notification may be converted to text (e.g., utilizing one or more speech-to-text conversions, etc.), and textual classification may be used to identify the topic associated with the text. In another embodiment, the topic may be identified utilizing image recognition.

For example, if the notification includes an image, video, and/or hologram, objects within the image, video, and/or hologram may be identified and analyzed in order to determine the topic associated with the notification. In another example, the identified objects may be compared to a list of predetermined objects that are linked to associated topics in order to determine one or more topics associated with the notification. In yet another example, the identified objects may be input into a neural network trained to determine an associated topic when given one or more input object types.

In addition, in one embodiment, the topic may be selected from one or more predetermined topics. In another embodiment, if a plurality of topics are determined for the notification, each of the plurality of topics may be weighted, based on an analysis of the notification, where a higher weight may correspond to a greater relevance of the topic to the notification. In yet another embodiment, the topic with the highest weight may be selected as the identified topic. The weights, for example, may be equivalent to the confidence level output by a neural network or other classifier.

Furthermore, method 300 may proceed with operation 306, where a plurality of policies associated with the topic are determined. In one embodiment, each of the plurality of policies may be associated with one or more users. For example, one or more of the plurality of policies may be created by the user. In another example, one or more of the plurality of policies may be dynamically created based on past user activity, feedback from the user, etc. For instance, actions taken by the user in response to historical notifications in various environmental contexts may be monitored and used to determine one or more of the plurality of policies.

Further still, in one embodiment, each policy may include parameters including an associated topic, environmental context, and generalization level. For example, the topic may include one or more terms categorizing the notification. In another example, the environmental context may include one or more factors associated with a device and/or user at a time when the notification is received. In yet another example, the generalization level may include a level for which content of the notification is to be modified. For instance, a higher generalization level may correspond to a greater level of notification modification.

Also, in one embodiment, each of the plurality of policies associated with the topic may include an associated topic parameter matching the topic identified for the notification. For example, each of the plurality of policies associated with the topic may include different environmental context parameters, as well as different corresponding generalization level parameters. In another embodiment, the topic may be compared to a plurality of stored policies, and a subset of the plurality of stored policies having an associated topic parameter matching the topic may be selected and returned. For example, each of the plurality of stored policies may be associated with a predetermined user and/or device that received the notification.

Additionally, in one embodiment, the plurality of policies may be stored locally or remotely. For example, the plurality of policies may be stored within the device that receives the notification. In another example, the plurality of policies may be stored at a data store (e.g., database, etc.) remote from the device that receives the notification. In yet another example, the topic and a user identifier may be sent from the device to the remote data store, and the remote data store may return the plurality of policies associated with the user ID that match the topic.

Further, in one embodiment, each of the plurality of policies may be predetermined. For example, one or more of the plurality of policies may be input manually by a user, an organization associated with the user, etc. In another example, one or more of the plurality of policies may be determined based on historical actions performed by the user and/or device. In another embodiment, each of the plurality of policies may be dynamically determined on the fly (e.g., utilizing a neural network, etc.). In one embodiment, in response to determining that no policy is associated with the topic, one or more user-defined policies may be requested and received from the user.

Further still, method 300 may proceed with operation 308, where a current environmental context is determined. In one embodiment, the current environmental context may include a current location of the device that received the notification. For example, the current location of the device may be determined utilizing a global positioning system (GPS) module within the mobile device and/or one or more map applications running within the device. In another example, current location of the device may be determined utilizing triangulation and a cellular communications module within the mobile device. In yet another example, the current location of the device may be manually input by the user, derived from one or more images and/or video provided by the user, etc.

Also, in one embodiment, the current environmental context may include a proximity of other devices to the device. For example, a number of devices (mobile devices, etc.) within a predetermined communications protocol proximity/range (e.g., Bluetooth range, etc.) may be determined. In another embodiment, the current environmental context may include an ambient noise level of the device. For example, the ambient noise level may be determined utilizing a microphone of the device.

In addition, in one embodiment, the current environmental context may include a proximity of additional users to a user to whom the notification is sent. For example, the proximity of additional users may be determined utilizing one or more cameras of the device. In another embodiment, the current environmental context may include one or more events that are currently occurring. For example, the one or more events may be determined by referencing a calendar of the device, a remote centralized calendar associated with a user of the device, etc.

Furthermore, in one embodiment, the current environmental context may be selected from one or more predetermined environmental contexts. In another example, the current environmental context may be determined to be "unknown" if a selection cannot be made from one or more predetermined environmental contexts. For example, environmental factors may be determined, utilizing one or more components of the device (e.g., one or more cameras, GPS module, map application, microphone, calendar application, communications protocol interfaces, etc.).

Further still, in one embodiment, these environmental factors may be compared to predetermined groupings of environmental factors that are each associated with a predetermined environmental context to determine a match. In another embodiment, if a match is found between currently identified environmental factors and a predetermined grouping of environmental factors, the associated predetermined environmental context may be selected as the current environmental context. In yet another embodiment, if no match is found between currently identified environmental factors and a predetermined grouping of environmental factors, an "unknown" environmental context may be selected as the current environmental context.

Also, method 300 may proceed with operation 310, where a generalization level is determined, utilizing the plurality of policies and the current environmental context. In one embodiment, the generalization level may include a level for which content of the notification is to be modified. In another embodiment, a higher generalization level may correspond to a greater level of notification modification. In yet another embodiment, the generalization level may be associated with one or more specific modifications to be applied to the notification (e.g., text modification, volume adjustment, display size adjustment, presented notification type, etc.).

In one embodiment, each policy associated with a predetermined user/device may include parameters including an associated topic, environmental context, and generalization level. In another embodiment, the plurality of policies may all have an associated topic matching the topic associated with the notification.

Additionally, in one embodiment, the current environmental context may be compared to the plurality of policies in order to determine a matching policy associated with the predetermined user/device that has an associated environmental context that matches the current environmental context. In another embodiment, the matching policy may be associated with the predetermine user/device, may have an associated topic matching the topic associated with the notification, and may have an associated environmental context matching the current environmental context. In yet another embodiment, the generalization level may include the generalization level of the matching policy.

Further, method 300 may proceed with operation 312, where the notification is modified, based on the generalization level. In one embodiment, the notification may be analyzed utilizing natural language processing. For example, if the notification includes textual data, the textual data may be parsed to determine various component types such as address, event type, associated users, associated user details, associated time and/or date, etc. In another embodiment, components of the notification may be labelled according to the natural language processing.

For example, each of the various components may be labelled with an associated identifier identifying the associated component type. In another example, if the notification is a notification for a doctor's appointment, the text of the notification may be parsed in order to identify components identifying a name of the doctor, a specialty of the doctor, a procedure being performed by the doctor, an address of the doctor, a time and date of the appointment, etc.

Also, in one embodiment, the notification may be analyzed utilizing part-of-speech tagging. For example, if the notification includes textual data, the textual data may be parsed to determine various nouns, adjectives, etc. of components within the textual data. In another example, the components may be labelled with their identified part of speech.

In addition, in one embodiment, components of the notification may be labelled utilizing image recognition. For example, if the notification includes an image, video, and/or hologram, objects within the image, video, and/or hologram may be identified and analyzed in order to determine identifiers associated with the objects. In another embodiment, each of those components may be listed and labelled with their associated identifiers.

Furthermore, in one embodiment, the notification may be modified utilizing text modification and/or reduction. For example, text simplification may be performed on the parsed and labelled text of the notification. In another example, the text simplification may include any process that reduces a syntactic or lexical complexity of the text while preserving a meaning and/or information content of the text. In yet another example, a level of text simplification may correspond to the generalization level.

Further still, in one embodiment, the notification may be modified utilizing visual modification. For example, one or more objects within a picture or video may be blurred. In another embodiment, the notification may be modified by converting a type of all or a portion of the notification. For example, all or part of the notification may be converted from textual to audio, from audio to textual, from textual to haptic, from video to pictorial, etc.

Also, in one embodiment, the notification may be modified by adjusting a volume at which the notification is presented. For example, a higher presentation volume may correspond to a lower level of notification modification. In another embodiment, the notification may be modified by adjusting a size of the presented notification (e.g., as an image, hologram, etc.). For example, a larger presentation size may correspond to a lower level of notification modification. In yet another embodiment, the notification may be modified by adding a request for user action to the notification.

Additionally, method 300 may proceed with operation 314, where the modified notification is presented. In one embodiment, the modified notification may be presented to one or more users. In another embodiment, the modified notification may be presented, utilizing the device. For example, the modified notification may be presented utilizing one or more of a display of the device, a speaker of the device, one or more lights of the device, a vibration component of the device, etc.

Further, in one embodiment, if the modified notification includes a request for user action, the user may be presented with the request prior to additional content of the modified notification. For example, the user may be asked if they want to proceed with receiving content of the notification, and the content may be presented only in response to the user agreeing to proceed.

In this way, content of the notification may be dynamically modified based on a current environmental context of the recipient. This may increase a level of data security provided to the recipient, which may in turn reduce a risk of data theft within the notification. Additionally, implementing notification data security may be offset to a recipient device, which may reduce an amount of processing performed by devices and/or applications that create and send notifications. This may in turn improve a performance of such devices and/or applications. Further, by analyzing an environmental context and implementing contextual data security/privacy at a recipient device instead of a device that sends notifications, an amount of data transmitted over a network may be reduced, which may improve a performance of one or more components of the environment (e.g., routers, switches, etc.), as well as the sending and recipient devices.

Figure 4:
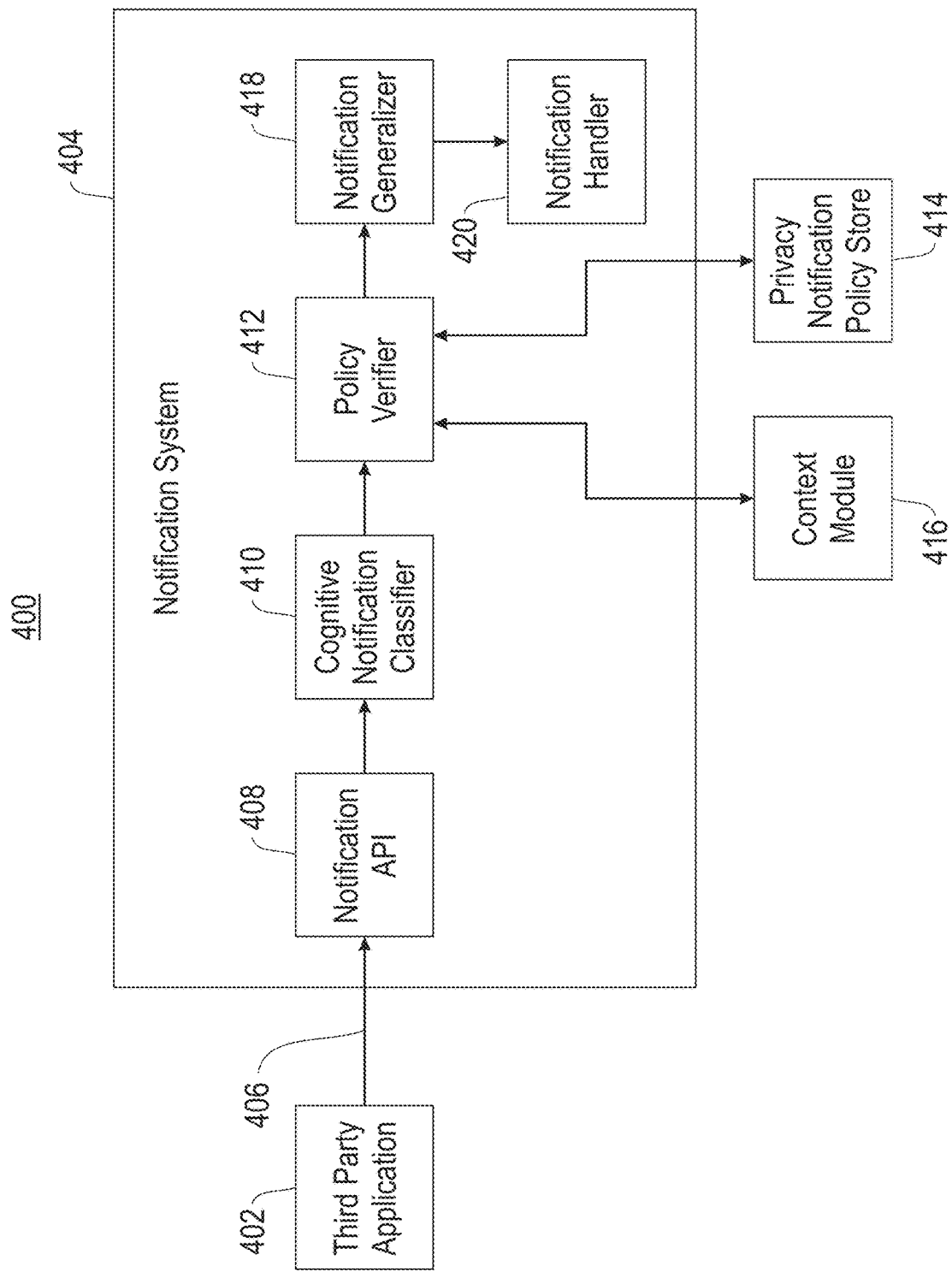
FIG. 4 illustrates an exemplary notification system environment, in accordance with one embodiment.

FIG. 4 illustrates an exemplary notification system environment 400, according to one exemplary embodiment. As shown, a third-party application 402 is in communication with a notification system 404 via a network connection 406 and/or a notification application program interface (API) 408. Although the third-party application 402 is shown external to the notification system 404, in one embodiment, the third-party application 402 may be located within the notification system 404 and may communicate via the notification API 408. In one embodiment, the third-party application 402 may include an application and/or service running a system separate from the notification system 404 (e.g., a messaging server, a cloud-based calendar or message server, etc.).

Additionally, in one embodiment, the notification API 408 of the notification system 404 may receive a notification from the third-party application 402. The notification may be generated by the third-party application 402 and sent to the notification system 404 via the network connection 406. In another embodiment, the notification may then be sent from the notification API 408 to a cognitive notification classifier 410 of the notification system 404.

Further, in one embodiment, the cognitive notification classifier 410 may identify a topic associated with the notification, and may send the topic as well as the notification to a policy verifier 412 within the notification system. In response to receiving the topic and notification from the cognitive notification classifier 410, the policy verifier 412 may send the received topic to a privacy notification policy store 414. In another embodiment, the policy verifier 412 may also send a user ID associated with the notification system (e.g., an identifier of a user of a device running the notification system 404, etc.) to the privacy notification policy store 414.

Further still, in one embodiment, the privacy notification policy store 414 may determine and return a plurality of policies associated with the received topic and/or user ID to the policy verifier 412. Although the privacy notification policy store 414 is shown external from the notification system 404, in one embodiment, the privacy notification policy store 414 may be included within the notification system 404.

In one embodiment, the plurality of policies may include a plurality of tuples. For example, given a notification generalization specification by levels, a privacy notification policy may be defined as the following tuple:

<AnouncementType, context, generalizationLevel>

A plurality of exemplary medical notification tuples is shown below in Table 1:

TABLE 1

<HealthcareAppointment, alone, Level_0>
<HealthcareAppointment, personalOffice, Level_1 >
<HealthcareAppointment, cafeteria, Level_2 >
<HealthcareAppointment, publicPlaces, Level_3 >
<HealthcareAppointment, unknown, wait >

Additionally, in one embodiment, policies may be customized by a user of a device. For example, a list of security/privacy topics may be provided to a user, and the user may specify which policies to apply to which topics. In another example, a list of third-party applications may be provided to a user, and the user may specify which policies to apply to which third-party applications.

In another embodiment, the first time a notification of a particular type is received at the notification system 404, the user may be notified, and a selection of a particular policy to apply to the notification may be received from the user. This selected policy may be applied to future notifications of the same type. In yet another embodiment, if a notification is received from an untrusted application, the most secure policy (e.g., the policy implementing the highest generalization level, etc.) may be applied to the notification. In still another embodiment, if a notification is received from a trusted application, the least secure policy (e.g., the policy implementing the lowest generalization level, etc.) may be applied to the notification.

Also, in one embodiment, a request for a current environmental context may be sent from the policy verifier 412 to a context module 416. In another embodiment, in response to receiving the request, the context module 416 may utilize one or more components of a device (e.g., a GPS module, one or more cameras, one or more microphones, etc.) to determine a current environmental context, and return the current environmental context to the policy verifier 412. Although the context module 416 is shown external from the notification system 404, in one embodiment, the context module 416 may be included within the notification system 404. It should also be noted that one or more components of the notification system 404 may be located in a cloud computing environment and may be remotely accessed by other local device-based components of the notification system 404.

In addition, in one embodiment, the policy verifier may determine a generalization level to be implemented for the received notification, based on the received plurality of policies and the received current environmental context. This generalization level may be sent with the notification from the policy verifier 412 to a notification generalizer 418. The notification generalizer 418 may modify the received notification, based on the received generalization level, thereby creating a modified notification.

The notification generalizer 418 may implement a plurality of generalization techniques that may include but are not limited to proper noun reduction, where nouns such as names and last names are suppressed from the notification; noun reduction, where a noun is replaced by a more general noun; and address generalization, where an address is generalized by removing certain components. Additionally, the notification generalizer 418 may define what information needs to be preserved in the notification, so as to avoid the generalization techniques from stripping down the notifications of that information.

Furthermore, in one embodiment, the notification generalizer may send the modified notification to a notification handler 420. In response to receiving the modified notification, the notification handler 420 may present the modified notification to one or more users. In another embodiment, the notification handler 420 may send the modified notification to an external system.

Figure 5:
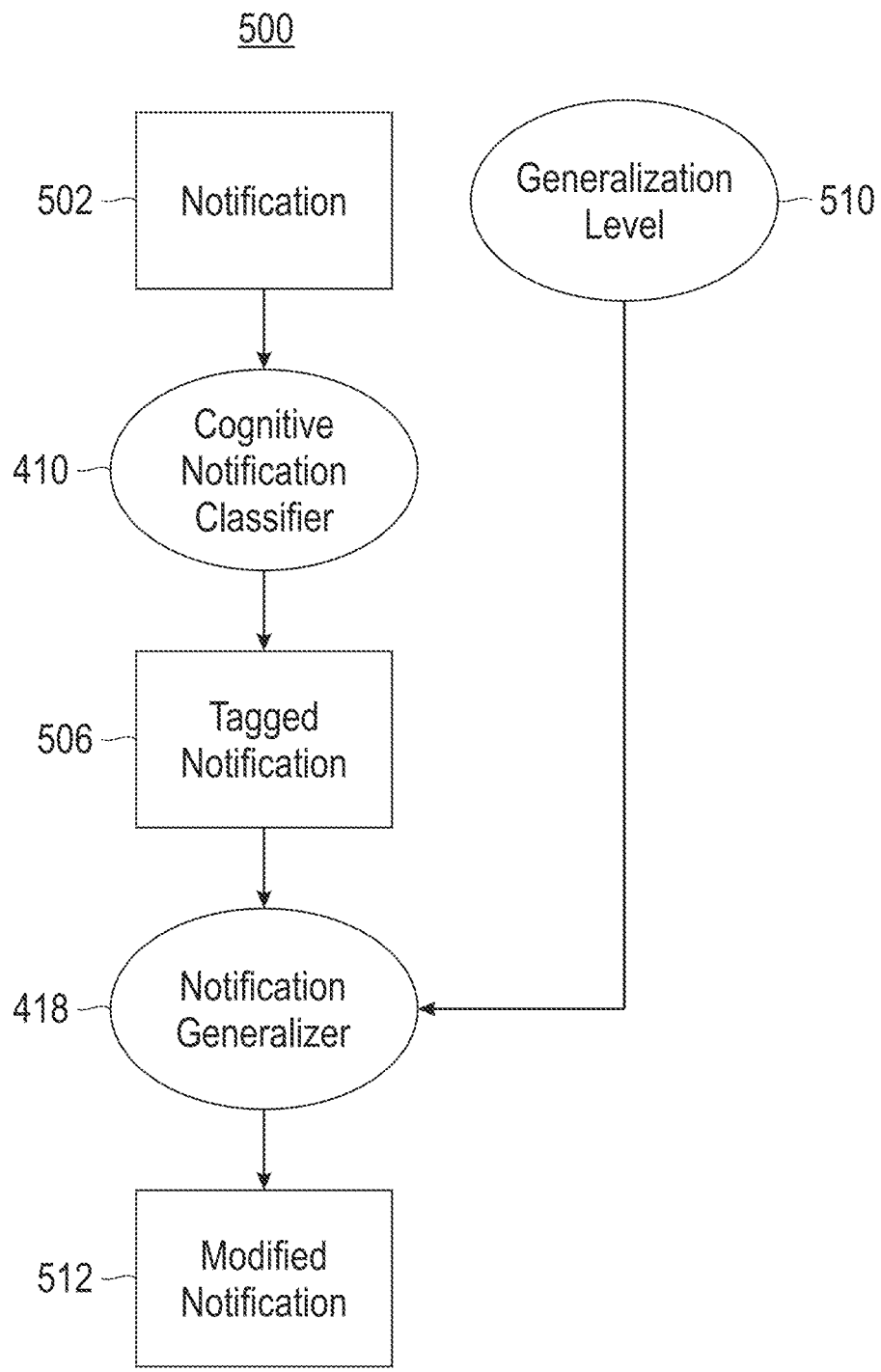
FIG. 5 illustrates an exemplary flow of the notification system of FIG. 4 for generating private text-based notifications, in accordance with one embodiment.

FIG. 5 illustrates an exemplary flow 500 of the notification system 400 of FIG. 4 for generating private text-based notifications, according to one exemplary embodiment. As shown, a notification 502 is received by a cognitive notification classifier 410 that performs natural language processing and part-of-speech tagging on the notification 502. For example, the cognitive notification classifier 410 may parse the notification 502 and may label components within the notification to create a tagged notification 506. In another embodiment, the cognitive notification classifier 410 is implemented by a neural network or other machine learning classifier.

After performing natural language processing and part-of-speech tagging on the notification 502, the cognitive notification classifier 410 may create a tagged notification 506. For example, the notification 502 may include a textual notification with the following information:

"You have medical testing scheduled today at 2 pm with Dr. Bob Smith at 250 Main Street, Los Angeles, Calif."

After performing natural language processing and part-of-speech tagging on the notification 502, the cognitive notification classifier 410 may create a tagged notification 506, as shown below in Table 2 for the example notification presented above.

TABLE 2

Event: medical testing
Date: today (4.19.17)
Time: 2 pm
Name: Dr. Bob Smith
Location_Office: ⊘
Location_Street: 250 Main St.
Location_Town: Los Angeles
Location_State: CA Additionally, the cognitive notification classifier 410 sends the tagged notification 506 to the notification generalizer 418. In one embodiment, the notification generalizer 418 may implement one or more generalization techniques described hereinabove on the tagged notification, while preserving some information within the tagged notification 506.

For example, given the above exemplary tagged notification 506 as shown in Table 1, notification generalizer 418 may determine a plurality of reduction levels for each component within the tagged notification 506, as shown below in Table 3. The reduction levels are presented in order of decreasing security/privacy.

TABLE 3

| Tag | Name (proper noun reduction levels) | Event (noun reduction levels) | Address reduction levels |
|---|---|---|---|
| Generalization chain | Dr. Bob Smith => Dr. Smith => Doctor => ⊘ | Medical testing => procedure => Doctor's appointment => appointment => ⊘ | Full address => Town only => ⊘ |

The reduction levels may be associated with one or more security/privacy contexts, as shown below in Table 4:

TABLE 4

| Security/ Privacy Context | People | Descriptions | Logistics |
|---|---|---|---|
| Least private/ secure | Full Name: Dr. Smith at 2 pm | Full Description: medical testing | Full Address: At 250 Main Street, Los Angeles |
| More private/ secure | Role Name: Doctor's at 2 pm | Description Gloss: Appointment for your procedure | Town Only: In Los Angeles |
| Most private/ secure | No Name: 2 pm appointment | Generic Description: appointment | No location ⊘ |

Utilizing these reduction levels and security/privacy contexts, the notification generalizer 418 may modify the notification 502 to create a modified notification 512, based on a received generalization level 510. In one embodiment, the notification generalizer 418 may perform text simplification on the notification 502, where the text simplification includes any process that reduces the syntactic or lexical complexity of text while preserving its meaning and information content.

For example, given the plurality of reduction levels for each component within the tagged notification 506 as shown in Table 3, the notification generalizer 418 may modify the notification 502 using text simplification based on the generalization level 510, as shown below in Table 5.

TABLE 5

| Generalization Level 1 (minimum privacy) | Generalization Level 2 | Generalization Level 3 | Generalization Level 4 | Generalization Level 5 (maximum privacy) | Unknown Generalization Level |
|---|---|---|---|---|---|
| "You have your medical testing appointment today at 2 pm with Dr. Bob Smith at 250 | "You have your ~~medical testing~~ procedure ~~appointment~~ today at 2 pm with Dr. ~~Bob~~ | "You have a ~~procedure with~~ Doctor's appointment Smith today at 2 pm at 250 Main Street, | "You have an ~~Doctor's~~ appointment today ~~at 2 pm~~ ~~at 250 Main~~ ~~Street,~~ in Los Angeles" | "You have an appointment today at 2 pm ~~in Los~~ ~~Angeles~~" | "There is a reminder for you - Is this a good time?" |

TABLE 5-continued

| Generalization Level 1 (minimum privacy) | Generalization Level 2 | Generalization Level 3 | Generalization Level 4 | Generalization Level 5 (maximum privacy) | Unknown Generalization Level |
|---|---|---|---|---|---|
| Main Street, Los Angeles" | Smith at 250 Main Street, Los Angeles" | Los Angeles" | | | |

In another embodiment, the modified notification 512 may be sent from the notification generalizer 418 to another entity (e.g., the notification handler 420 shown in FIG. 4, etc.). In yet another embodiment, the notification generalizer 418 may also determine a medium to use (e.g., voice notification, text message, picture, video, hologram, etc.) based on context and privacy settings.

Further, in one embodiment, generalization levels can also be combined to include variations in a medium used to show the notification (e.g., voice, hologram, haptic feedback, text message, picture, video, etc.), as well as a volume of the notification, size of a picture/hologram, etc.

In this way, a set of notification privacy generalization levels may specify ways in which a particular notification can be generalized to achieve different privacy levels. A privacy generalization level may define changes in the content of the notification, display medium and medium attributes (e.g., volume, etc.). A cognitive notification classifier may take the triggered notification and may analyze its content to determine its notification type.

Additionally, a privacy aware notification generalization policy may link a notification type to a privacy generalization level to be applied for a context. A policy verifier may select the set of policies to apply given the current notification topic/type, context of the user and retrieved privacy notification generalization policy. A notification generalizer may then apply a required privacy generalization level determined by the policy verifier to the notification.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying a topic associated with a notification received at a mobile device, the notification including a message received via an interface of the mobile device, wherein identifying the topic includes:
      determining a plurality of topics for the notification,
      assigning a weight to each of the plurality of topics, and
      selecting one of the plurality of topics with a highest weight as the identified topic;
   determining a plurality of policies associated with the topic;
   determining a current environmental context for the mobile device, including a proximity of additional mobile devices to the mobile device;
   determining a generalization level, utilizing the plurality of policies and the current environmental context for the mobile device;
   modifying the notification, based on the generalization level, the modifying including reducing a syntactic complexity of text of the notification while preserving a meaning and information content of the text of the notification; and
   presenting the modified notification, utilizing the mobile device.

2. The computer-implemented method of claim 1, wherein the notification is selected from a group consisting of text, audio, images, and video.

3. The computer-implemented method of claim 1, wherein the topic includes one or more terms categorizing the notification.

4. The computer-implemented method of claim 1, wherein the topic is identified utilizing textual classification.

5. The computer-implemented method of claim 1, wherein the topic is identified utilizing a neural network.

6. The computer-implemented method of claim 1, wherein each of the plurality of policies includes parameters including an associated topic, environmental context, and a generalization level indicating a level for which content of the notification is to be modified.

7. The computer-implemented method of claim 1, wherein each of the plurality of policies associated with the topic includes an associated topic parameter matching the topic identified for the notification.

8. The computer-implemented method of claim 1, wherein the current environmental context for the mobile device includes:
   a current location of the mobile device,
   an ambient noise level of the mobile device,
   a proximity of additional users to a user to whom the notification is sent, and
   one or more events that are currently occurring.

9. The computer-implemented method of claim 1, wherein:
   identifying the topic includes:
      determining a plurality of topics for the notification, assigning a weight to each of the plurality of topics, based on an analysis of the notification, and selecting one of the plurality of topics with a highest weight as the identified topic, and one or more of the plurality of policies is dynamically created based on past user activity and includes an associated topic, environmental context, and generalization level.

10. The computer-implemented method of claim 1, wherein the current environmental context is compared to the plurality of policies in order to determine a matching policy associated with a predetermined user that has an associated environmental context that matches the current environmental context.

11. The computer-implemented method of claim 1, wherein identifying the topic includes:

determining a plurality of topics for the notification;

assigning a weight to each of the plurality of topics, based on an analysis of the notification, where the weight includes a confidence level output by a neural network; and selecting one of the plurality of topics with a highest weight as the identified topic.

12. The computer-implemented method of claim 1, wherein modifying the notification includes:

analyzing the notification utilizing natural language processing; and labelling components of the notification according to the natural language processing.

13. The computer-implemented method of claim 1, wherein:

one or more of the plurality of policies is dynamically created based on past user activity and includes an associated topic, environmental context, and generalization level, and the current environmental context for the mobile device includes an ambient noise level determined utilizing a microphone of the mobile device and a proximity of additional users to a user to whom the notification is sent determined utilizing one or more cameras of the mobile device.

14. The computer-implemented method of claim 1, comprising determining a matching policy from the plurality of policies associated with the topic, where the matching policy:

includes an associated topic matching the topic associated with the notification, and includes an associated environmental context matching the current environmental context for the mobile device;

wherein the determined generalization level includes an associated generalization level of the matching policy.

15. The computer-implemented method of claim 1, wherein:

a higher generalization level corresponds to a greater level of notification modification, and the generalization level is associated with specific modifications to be applied to the notification, including volume adjustment, display size adjustment, and presented notification type.

16. A computer program product comprising one or more computer readable storage media, and program instructions collectively stored on the one or more computer readable storage media, the program instructions comprising instructions configured to cause one or more processors to perform a method comprising:

identifying a topic associated with a notification received at a mobile device, utilizing the one or more processors, the notification including a message received via an interface of the mobile device, wherein identifying the topic includes:

determining a plurality of topics for the notification, assigning a weight to each of the plurality of topics, and selecting one of the plurality of topics with a highest weight as the identified topic;

determining a plurality of policies associated with the topic, utilizing the one or more processors;

determining a current environmental context for the mobile device, including a proximity of additional mobile devices to the mobile device, utilizing the one or more processors;

determining, utilizing the one or more processors, a generalization level, utilizing the plurality of policies and the current environmental context for the mobile device;

modifying, utilizing the one or more processors, the notification, based on the generalization level, the modifying including reducing a syntactic complexity of text of the notification while preserving a meaning and information content of the text of the notification; and presenting the modified notification, utilizing the one or more processors.

17. A system, comprising:

a processor; and logic integrated with the processor, executable by the processor, or integrated with and executable by the processor, the logic being configured to:

identify a topic associated with a notification received at a mobile device, the notification including a message received via an interface of the mobile device, wherein identifying the topic includes:

determining a plurality of topics for the notification, assigning a weight to each of the plurality of topics, and selecting one of the plurality of topics with a highest weight as the identified topic;

determine a plurality of policies associated with the topic;

determine a current environmental context for the mobile device, including a proximity of additional mobile devices to the mobile device;

determine a generalization level, utilizing the plurality of policies and the current environmental context for the mobile device;

modify the notification, based on the generalization level, the modifying including reducing a syntactic complexity of text of the notification while preserving a meaning and information content of the text of the notification; and present the modified notification, utilizing the mobile device.

* * * * *